A. J. PLATT.
LAWN RAKE.
APPLICATION FILED NOV. 11, 1909.
957,900.
Patented May 17, 1910.
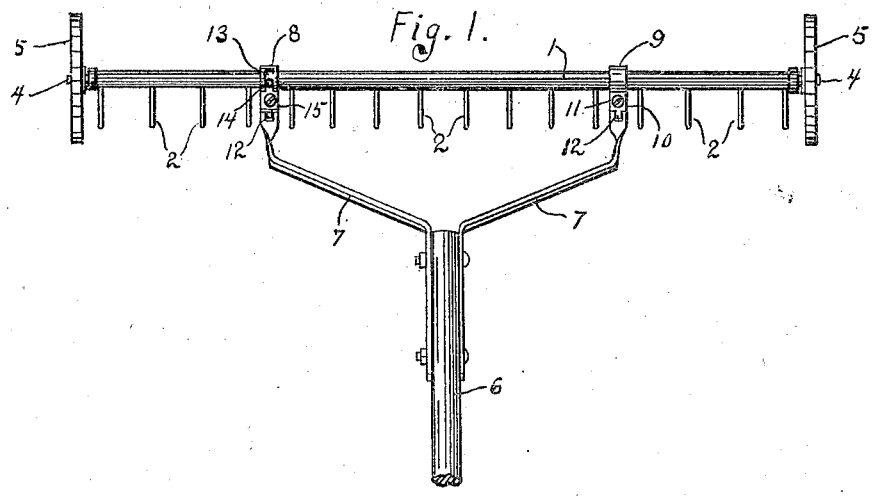
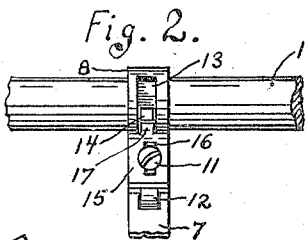
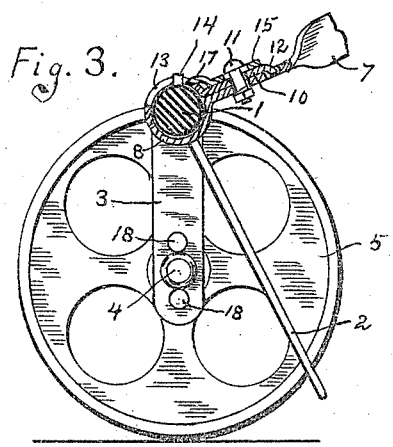 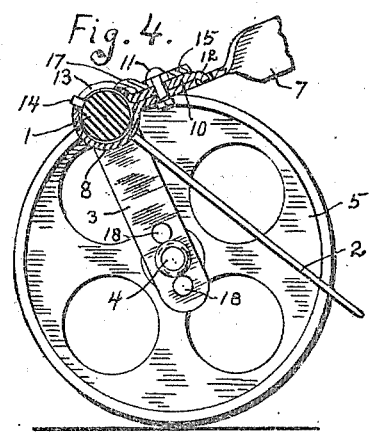
WITNESSES:
D. L. Weaver
Walter G. Reed
INVENTOR
Addison J. Platt,
BY Walter N. Haskell,
his ATTORNEY.

UNITED STATES PATENT OFFICE.

ADDISON J. PLATT, OF STERLING, ILLINOIS.

LAWN-RAKE.

957,900.  Specification of Letters Patent. Patented May 17, 1910.

Application filed November 11, 1909. Serial No. 527,537.

*To all whom it may concern:*

Be it known that I, ADDISON J. PLATT, a citizen of the United States, residing at Sterling, in the county of Whiteside and State of Illinois, have invented certain new and useful Improvements in Lawn-Rakes, of which the following is a specification.

My invention has reference to lawn rakes, and aims to provide a simple, cheap and durable device of that class in the use of which the operator is relieved from a large part of the labor which is commonly attendant upon the use of such instruments.

The chief features of my device consist in supporting the rake-head so that the points of the teeth will be free from the ground, and providing rocking means for the rake-head, so that in the rearward movement of the rake the teeth will be inclined forwardly and raised, so as to readily withdraw from the material that has been raked thereby, and pass rearwardly over the same. I also provide novel mechanism for adjustably controlling the rocking movement of the rake-head.

The construction, arrangement and operation of the parts comprising my invention will more fully appear in the following specification, reference being had to the drawings accompanying the same, wherein:

Figure 1 is a plan view of the rake-head, in position when in use. Fig 2 is an enlarged detail, showing the sleeve 8 and appurtenant parts, in plan. Fig. 3 is a vertical section through the shaft 1 and sleeve 8, with the rake-head in position on the forward movement thereof. Fig. 4 is a similar view with the rake-head in position on the rearward movement thereof.

Similar numbers refer to corresponding parts throughout the several figures.

The rake-head comprises a shaft 1 and plurality of teeth 2 rigidly secured thereto, the shaft 1 being provided at its ends with supports 3, (one only being shown) the lower ends of said supports having pins 4 upon which are secured small carrying wheels 5.

6 represents the lower end of the handle, to which is attached a pair of arms 7, preferably formed of strap-metal, and provided at their outer ends with sleeves 8 and 9, loosely encircling the shaft 1, said sleeves being formed, as shown herein, by twisting the ends of the arms 7 until the plane thereof is at right angles to that of said arms, then forming the circular sleeves therein, and securing the ends 10 to the main part of the arms 7 by means of bolts 11 passing through perforations in said parts. The ends 10 are also provided with tongues 12, bent downwardly into recesses in the arms 7, and aiding in holding the ends 10 in line with the parts to which they are attached.

The sleeve 8 is provided with a slot 13, engaging a lug 14 secured to the shaft 1, by which means said shaft is permitted a limited rocking movement in the sleeves 8 and 9. Secured upon the end 10 of the sleeve 8, by means of the bolt 11, is a plate 15, having a slot 16, permitting adjustment of such plate longitudinally of the part 10. At one end the plate 15 is provided with a tongue 17, adapted to enter the slot 13, and form a stop for the lug 14. By adjustment of the plate 15 the rocking movement of the shaft 1 may be increased or diminished, as desired.

The supports 3 can be provided with a series of holes 18, for the insertion of the pin 4, whereby the shaft 1 can be raised or lowered, varying the position of the teeth with reference to the ground.

The sleeves 8 and 9 can be formed in two parts, if desired, for convenience in placing in position, the part 10 and upper half of the sleeve being separate from the lower part, and capable of being independently removed or replaced.

The operation of my device is illustrated in Figs. 3 and 4. As the rake is drawn forwardly the supports 3 rock forwardly until the lug 14 is in contact with the forward end of the slot 13, holding the supports in a substantially vertical position, with the teeth 2 clearing the ground, but sufficiently close thereto to gather the loose material thereon, and draw it along with the rake. On the return movement of the rake the supports 3 rock rearwardly, carrying the teeth 2 upwardly and some distance above the earth, permitting them to clear the material which has been raked thereby. See Fig. 4.

If desired, runners or other supporting means can be substituted for the wheels 5, and other structural changes can be made in the device without departing from the spirit of the invention.

It is obvious that the operator is entirely relieved from the weight of the rake-head, all of the force that is required to be expended being such as is necessary to roll the rake backward and forward. It is also apparent that all danger of the points of the teeth becoming caught in the earth is precluded.

What I claim as my invention, and desire to secure by Letters Patent of the United States, is:

1. A lawn rake, comprising a handle; a pair of diverging arms attached thereto, and provided at their outer ends with transverse sleeves; a rake-head, rockingly supported in said sleeves, and having a plurality of teeth; a slot in one of said sleeves, extending transversely of the rake-head; a lug, fixed in said rake-head, and engaged by said slot; and means for slidably supporting said rake-head, so as to prevent contact of the rake-teeth with the earth.

2. A device of the class named, comprising a handle; a pair of diverging arms attached thereto, and provided at their outer ends with transverse sleeves; a rake-head, rockingly supported in said sleeves, a slot in one of said sleeves, transversely of the rake-head; a lug, fixed in said rake-head, and engaged by said slot; means for adjustably increasing or decreasing the length of said slot, to vary the amount of the rocking movement of said rake-head; and means for slidably supporting said rake-head, so as to prevent contact of the rake-teeth with the earth.

3. In a device of the class named, a rake-head, having a plurality of teeth, and provided with supports at its ends; carrying wheels, secured to said supports, so as to permit a rocking movement of the rake-head; adjustable means for raising or lowering said head; a handle; a pair of arms, attached to said handle, and provided with sleeves loosely encircling said rake-head; a slot in one of said sleeves; a pin in said rake-head, engaged by said slot, whereby the rocking movement of said rake-head is limited; and a plate, supported conveniently to said sleeve, provided with a tongue adapted to enter said slot, said plate being adjustable with reference to said slot, so as to increase or diminish the length thereof.

4. In a device of the class named, a handle; a sleeve supported thereby, and provided with a longitudinal slot; a rake-head, having a plurality of teeth, loosely held in said sleeve, and provided with a lug, engaged by said slot, limiting the rocking movement of said rake-head; and a plate, supported conveniently to said sleeve; having a tongue adapted to enter said slot, and adjustable with reference thereto.

In testimony whereof I affix my signature in presence of two witnesses.

ADDISON J. PLATT.

Witnesses:
M. E. BARRIE,
W. N. HASKELL.